Patented Aug. 12, 1947

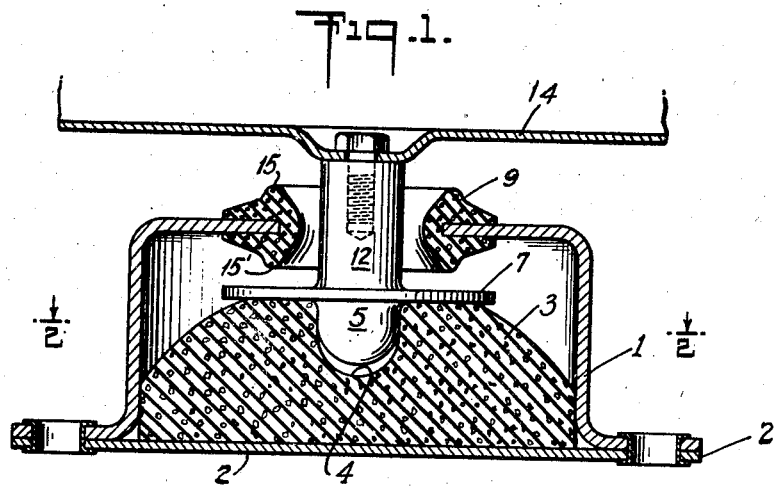
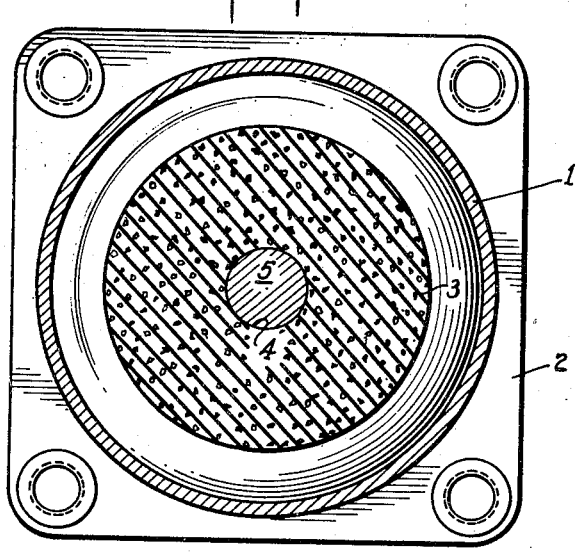
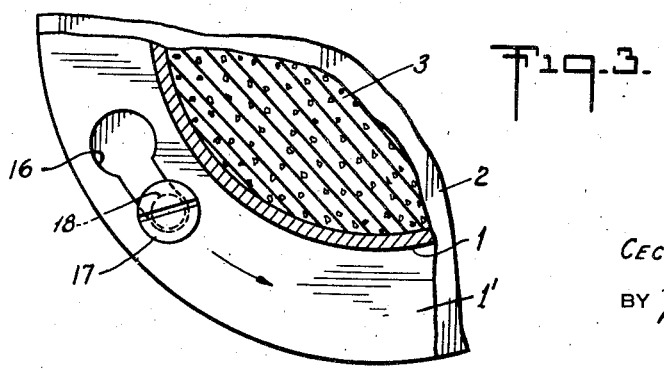

2,425,567

UNITED STATES PATENT OFFICE 2,425,567

VIBRATION ABSORPTION DEVICE

Cecil S. Robinson, New York, N. Y.

Application December 15, 1945, Serial No. 635,304

6 Claims. (Cl. 248—358)

This invention relates to vibration absorption units such as are used in mounting objects to be protected from mechanical vibration. The objectionable vibrations often found in airplanes, cars, ships and factories fall generally into two types—continuous vibrations of small amplitude, often invisible to the eye, which by their prolonged effect tend to destroy delicate parts or induce metal fatigue; and second, the occasional shock impact or momentary vibration of larger force or amplitude, such as may result for example from a power plant passing thru a harmonic period in its acceleration, or from a sudden change in velocity. One difficulty in the construction of all vibration absorption apparatus is that a unit sufficiently soft to absorb small vibrations may become unstable, gallop, or itself serve to create harmonic vibrations when exposed to impacts or vibrations of greater force.

The general object of the present invention is to provide a convenient and effective type of mounting which will minimize such difficulties; in particular to provide a graduated and highly absorptive action in the main cushion, without objectionable harmonics; to provide stability with eccentric or lateral loads; to avoid the necessity for bonding the rubber, so as to permit the use of aluminum; to provide a type of case which will give support and allow change of the cushions without discarding the unit; to provide for the control of momentary heavier shocks without impairing the ability of the unit to absorb the finer vibrations; and to produce self-contained complete units, each embodying the foregoing characteristics, which units when used singly or more often in multiple at various points of support may stabilize and insulate the supported object from shocks and vibrations. Various other objects incident to those above stated will become apparent as the description proceeds.

While one size of unit may serve a wide variety of uses, particularly where several are used on the same installation, the units may also be made in different grades or sizes to extend the range of applications.

Referring now to the drawing forming part of this specification,

Fig. 1 is a cross-sectional view on the line 1—1 of Fig. 2, showing the operating parts of the unit.

Fig. 2 is a plan view in cross-section on the line 2—2 of Fig. 1 showing the manner of centering the cushion in the casing, and also one means for locking the detachable bottom on the casing.

Fig. 3 is a fragmental view showing a circular rim with a modified form of a locking mechanism for the bottom.

Similar reference numerals refer to similar parts thruout the various views.

Referring now to Fig. 1, the casing 1 having the detachable base 2 encloses a somewhat pyramidal, conical or beehive shaped cushion 3 preferably made of sponge rubber, or of felt, synthetic or other material adapted to absorb vibration. The base of this cushion 3 is extended so as to be slightly compressed by the walls of the casing 1 at various points or all around to provide a good centering action and stability and be adequately supported against tipping or displacement. The cushion 3 is preferably not bonded to the casing 1 or base 2 so that it can be readily replaced, and so as not to impair its resilient properties. The lack of bonding also permits the use of aluminum or other light material, whereas ordinary bonded types are heavier, since bonding generally necessitates the use of steel. The upper or tapered top of the cushion 3 contains a central depression or cup 4 which is deeper than the plug or stem 5 which fits into it. The projecting base of the plug 5 does not touch the bottom of the depression 4 under ordinary light vibration, but only when the impact or amplitude of vibration has become excessive. This assists in providing a marked gradation or increase in resisting force as the load or the amplitude of vibration increases. This serves not only to discourage the building up of harmonics but also to provide a light resistance to vibrations of small amplitude, as most likely to absorb them, while more powerful vibrations meet increasing resistance until the base of the plug 5 bottoms in the cup 4 and the whole mass of the lower part of the cushion 3 takes the impact.

The conical or beehive shape of the cushion 3 is also well adapted to stabilize the cushion against toppling over under lateral loads, which in the past have tipped or buckled straight cylindrical standing cushions of the resilient type. Stability is highly important in most installations, as even those intended for vertical loads only may sometime receive unexpected lateral shocks or vibrations. In general the desired characteristics in the present invention are obtained with a relatively large volume of somewhat spongy or lightly loaded resilient material having a broadened base supported by the casing without bonding, and with the cushion tapering toward the loaded side where a central depression is preferably provided. Lateral stability is also enhanced by the supplementary cushion 9 or grommet to be described, which also cushions any extreme upward or downward movements.

The plug 5, which is also not bonded to the cushion, is provided with a flange 7 which with light loads rests on the top of the cushion 3 and then has a small clearance below the lower side of the annular grommet cushion 9 which is mounted around the hole in the top 10 of the casing 1. The stud or load supporting member 12 extends up from the plug 5 and flange 7 to carry the load of the object 14 being protected from vibrations.

With no load there is no clearance between the upper side of the flange 7 and the grommet 9, the flange 7 being held up in contact by the cushion 3. With normal loads and small vibrations the annular top of the cushion 3 carries the load, leaving a clearance between the upper face of the flange 7 and the grommet 9. Under heavier vibration or shock the vertical load causes the bottom of the projection 5 to strike the bottom of the cavity 4 and so considerably increases the elastic resistance. At the same time the load supporting member 12 is strongly centered and held against lateral disturbances. The plug 5 bottoms in the cup 4 before the base of the object 14 strikes the upper side of the grommet 9, so that the full effect of the cushion 3 is brought into play before the load can impinge on the supplementary cushion 9.

In the event that the whole apparatus becomes inverted or any other unusual force occurs, the flange 7 contacting the grommet cushion 9 holds the parts in place so that it will continue to operate as before when returned to its original position. Any number of these units may be used, and they do not necessarily have to be in a vertical position, as both the centering and the upward displacement are controlled as described. It will be noted that the upper and lower edges of the grommet 9 are narrowed and projecting as indicated at 15 and 15' so as to give somewhat the gradual type of resistance to light vibrations that was obtained by the cone shaped cushion 3.

The mechanical construction of the casing 1 and its base 2 may vary with the shape and size of the installation. The base plate 2 may be permanently attached by rivetting or spot welding in cheaper installations, but the base is preferably made detachable in the better installations in order to take full advantage of the lack of bonding, which permits replaceable cushions. When made detachable the base 2 may be held in place by a key-hole or bayonet lock or clip of some kind as shown for example in Fig. 3.

As shown in Fig. 3 the casing 1 is provided with an annular flange 1' in which is cut a key-hole shaped opening 16 wide enough at one end to pass the head 17 of the machine screw 18. The wide end of the key-hole opening 16 permits the case 1 to be slipped on the base plate 2, after which it is locked in place by rotating the case 1 relative to the base 2 so that the head 17 of the bolt 18 comes over the narrower part of the key-hole slot 16. Various other equivalent fastenings will be apparent to those skilled in the art. The important point is that a non-bonded cushion is combined with a removable base. In the past it has been customary to bond the cushion to the base. The fact that the cushions can be readily changed and replaced if necessary by cushions of other characteristics is of great assistance in solving particular vibration problems, which often must be solved by trial.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art without departing from the scope of the invention as stated in the following claims.

I claim:

1. In a vibration absorption device, the combination of a cushion having a broad base and a smaller top with a depression in the center of said top, a case surrounding and supporting said base, a load supporting member having a projection fitting in said depression, the depression being deeper than the projection when the cushion is lightly loaded but touching the bottom of the depression when heavily loaded to give added resistance to excessive impacts, a flange on said load supporting member, said flange resting on the top of the cushion to absorb vibrations, a supplementary cushion on said casing above said flange, said supplementary cushion being adapted to cushion impacts from either above or below, the foregoing parts being so proportioned that the projection on the load supporting member will bottom in the depression in the first mentioned cushion before the supplementary cushion comes into action.

2. In a vibration absorption device, the combination of a cushion having a broad base and a smaller top, a case surrounding and supporting said base, a load supporting member having a projecting portion to which the cushion is fitted to provide lateral stability, a flange on said load supporting member resting on one side on said cushion to absorb vibrations, a supplementary cushion on the other side of said flange to absorb excessive impacts and provide additional lateral stability, the foregoing parts being so proportioned that the first mentioned cushion under normal load will be strongly compressed before the load is resisted by the supplementary cushion.

3. In a vibration absorption device, the combination of a cushion having a broad base and a smaller top, a case surrounding and supporting said base, the case having a detachable bottom and the cushion being removable therefrom, a load supporting member having a projecting portion to which the cushion is fitted to provide lateral stability, a flange on said load supporting member resting on one side on said cushion to absorb vibrations, a supplementary cushion on the other side of said flange to absorb excessive impacts and provide additional lateral stability, the foregoing parts being so proportioned that the first mentioned cushion under normal load will be strongly compressed before the load is resisted by the supplementary cushion.

4. In a vibration absorption device, the combination of a cushion having a broad base and a smaller top with a depression in the center of said top, a case surrounding and supporting said base, a load supporting member having a projection fitting in said depression, the depression being deeper than the projection when the cushion is lightly loaded but touching the bottom of the depression when heavily loaded to give added resistance to excessive impacts, a flange on said load supporting member, said flange resting on the top of the cushion to absorb vibrations, a supplementary cushion on said casing above said flange, said supplementary cushion being in the form of a grommet cushion surrounding said load supporting member to absorb lateral impacts and having tapered faces to give progressive resistance to axial impacts.

5. In a vibration absorption device, the combination of a load supporting member, a flange on said member, a cushioning member on one side of said flange, said cushioning member having an opening thru which the supporting member extends so that it may be cushioned against lateral displacement, a cushion on the other side of said flange, said last mentioned cushion having a depression into which the supporting member projects and having an increasing volume of cushion beyond said depression, and a housing having lateral and terminal walls to retain the last mentioned cushion.

6. In a vibration absorption device, the combination of a load supporting member, a flange on said member, a cushioning member on one side of said flange, said cushioning member having an opening thru which the supporting member extends so that it may be cushioned against lateral displacement, said cushioning member also having tapered cushioning edges adapted to restrain the flange under excessive vibration, a larger tapered cushion on the other side of said flange, said larger cushion having a depression into which the supporting member projects, said larger cushion tapering outward, and a housing retaining the broader portion of said outwardly tapered cushion.

CECIL S. ROBINSON.